US009701395B2

(12) United States Patent
Veilleux, Jr. et al.

(10) Patent No.: US 9,701,395 B2
(45) Date of Patent: Jul. 11, 2017

(54) CONTRA-ROTATING OPEN ROTOR DISTRIBUTED PROPULSION SYSTEM

(71) Applicant: United Technologies Corporation, Hartford, CT (US)

(72) Inventors: Leo J. Veilleux, Jr., Wethersfield, CT (US); Lubomir A. Ribarov, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 45 days.

(21) Appl. No.: 14/578,975

(22) Filed: Dec. 22, 2014

(65) Prior Publication Data

US 2015/0284071 A1    Oct. 8, 2015

Related U.S. Application Data

(60) Provisional application No. 61/924,142, filed on Jan. 6, 2014.

(51) Int. Cl.
| | | |
|---|---|---|
| *B64C 11/48* | (2006.01) | |
| *B64D 27/14* | (2006.01) | |
| *B64D 35/08* | (2006.01) | |
| *B64D 35/06* | (2006.01) | |
| *B64D 27/00* | (2006.01) | |

(52) U.S. Cl.
CPC ............. *B64C 11/48* (2013.01); *B64D 27/14* (2013.01); *B64D 35/06* (2013.01); *B64D 35/08* (2013.01); *B64D 2027/005* (2013.01)

(58) Field of Classification Search
CPC ........ B64D 27/08; B64D 27/14; B64D 27/20; B64D 2027/005; B64D 35/04; B64D 35/06; B64D 35/08; B64C 11/48
See application file for complete search history.

(56) References Cited

U.S. PATENT DOCUMENTS

| | | | |
|---|---|---|---|
| 2,581,320 | A | 1/1952 | Burton et al. |
| 3,485,462 | A | 12/1969 | Spence |
| 4,688,995 | A | 8/1987 | Wright et al. |
| 6,279,852 | B1 | 8/2001 | Dusserre-Telmon et al. |
| 7,328,870 | B2 | 2/2008 | Lazare |
| 7,540,450 | B2 * | 6/2009 | Brand .................... B64D 27/14 244/54 |
| 7,643,928 | B2 | 1/2010 | Soucy |

(Continued)

FOREIGN PATENT DOCUMENTS

| | | | | |
|---|---|---|---|---|
| EP | 0272822 | A1 | 6/1988 | |
| GB | 443763 | A * | 3/1936 | ............. B64C 11/48 |
| GB | 2497136 | A | 6/2013 | |

OTHER PUBLICATIONS

Partial European Search Report for EP Application No. 15150203.6 dated Sep. 15, 2015.

*Primary Examiner* — Tien Dinh
*Assistant Examiner* — Richard R Green
(74) *Attorney, Agent, or Firm* — Carlson, Gaskey & Olds, P.C.

(57) ABSTRACT

A disclosed aircraft propulsion system includes a gas turbine engine supported within an aircraft fuselage, a main drive driven by the gas turbine engine and an open rotor propeller system supported outside of the aircraft fuselage separately from the gas turbine engine. A secondary drive that is driven by the main drive drives the open rotor propeller system.

11 Claims, 10 Drawing Sheets

(56) References Cited

U.S. PATENT DOCUMENTS

| | | | |
|---|---|---|---|
| 7,752,834 B2* | 7/2010 | Addis | B64D 27/10 244/60 |
| 8,083,173 B2 | 12/2011 | Arlton et al. | |
| 8,159,081 B2 | 4/2012 | Gainford et al. | |
| 8,176,725 B2* | 5/2012 | Norris | F02C 3/107 60/226.1 |
| 8,256,709 B2* | 9/2012 | Negulescu | B64D 27/08 244/54 |
| 8,438,829 B2 | 5/2013 | Negulescu | |
| 8,708,274 B2* | 4/2014 | Lord | B64D 27/14 244/55 |
| 2008/0099632 A1 | 5/2008 | Addis | |
| 2008/0258005 A1 | 10/2008 | Gall et al. | |
| 2010/0072318 A1* | 3/2010 | Westenberger | B64D 27/02 244/54 |
| 2011/0277447 A1 | 11/2011 | Sturmer | |
| 2011/0286842 A1 | 11/2011 | Danielson et al. | |
| 2012/0128487 A1 | 5/2012 | Eames | |
| 2012/0288358 A1 | 11/2012 | Balk | |
| 2013/0039764 A1 | 2/2013 | Perkinson | |

\* cited by examiner

CONTRA-ROTATING OPEN ROTOR DISTRIBUTED PROPULSION SYSTEM

REFERENCE TO RELATED APPLICATION

This application claims priority to U.S. Provisional Application No. 61/924,142 filed on Jan. 6, 2014.

BACKGROUND

A contra-rotating open rotor (CROR) propulsion system for an aircraft typically includes two engines mounted on either side of an aft portion of the aircraft fuselage. Each engine powers contra-rotating rotors that each includes a plurality of blades. Typically small turbine engines are utilized to drive a contra-rotating gearbox that provides the opposite rotation of the open rotors. Propulsive efficiency is provided by the large bypass flow at relatively low velocities. The large bypass volumes along with the lower velocities also provide favorable noise properties.

Although smaller turbine engines are often utilized, the radial cross-section of the engine reduces the effective area of the open rotors and thereby can reduce overall propulsive efficiency. The turbine engines' radial cross-section also causes increased resistance thus affecting adversely the aircraft's overall efficiency. Moreover, the support structure required for supporting the weight of the gas turbine engine away from the aircraft can limit the overall size of the contra-rotating open rotors and thereby overall propulsive efficiency.

Accordingly, improvements in contra-rotating propulsion systems are part of continued efforts by engine and aircraft manufacturers to improve engine performance and propulsive efficiencies.

SUMMARY

A aircraft propulsion system according to an exemplary embodiment of this disclosure, among other possible things includes a turbine engine supported within an aircraft fuselage, a main drive driven by the turbine engine, an open propeller system supported outside of the aircraft fuselage separately from the turbine engine, and a secondary drive driven by the main drive for driving the open propeller system.

In a further embodiment of any of the foregoing aircraft propulsion systems, the propeller system includes a contra-rotating open rotor propeller system.

In a further embodiment of any of the foregoing aircraft propulsion systems, the contra-rotating open rotor propeller system includes a forward propeller assembly and an aft propeller assembly having an outer diameter larger than the forward propeller assembly.

In a further embodiment of any of the foregoing aircraft propulsion systems, the contra-rotating propeller system includes a gearbox for generating contra rotation of a forward propeller assembly and an aft propeller assembly about a common axis of rotation.

In a further embodiment of any of the foregoing aircraft propulsion systems, the main drive includes a main gearbox and the secondary drive includes a propeller gearbox and the main gearbox is mechanically coupled to drive the propeller gearbox.

In a further embodiment of any of the foregoing aircraft propulsion systems, the main gearbox is supported within the aircraft fuselage and is driven through a mechanical coupling to the turbine engine.

In a further embodiment of any of the foregoing aircraft propulsion systems, the turbine engine includes a first turbine engine and second turbine engine supported within the aircraft fuselage and each of the first and second turbine engines are coupled to drive the main gearbox.

In a further embodiment of any of the foregoing aircraft propulsion systems, the first and second turbine engines are aligned along a common longitudinal axis.

In a further embodiment of any of the foregoing aircraft propulsion systems, the main drive includes a main electric generator generating electrical power and the secondary drive includes an electric motor driven by the main electric generator.

In a further embodiment of any of the foregoing aircraft propulsion systems, the propeller system includes a first propeller system mounted on a first side of the aircraft fuselage and a second propeller system mounted on a second side of the aircraft fuselage and the secondary drive includes first and second electric motors driven by the main electric generator for driving a corresponding one of the first and second electric motors.

In a further embodiment of any of the foregoing aircraft propulsion systems, the first and second electric motors are mounted within the aircraft fuselage and drive gearboxes mounted within a corresponding one of the first and second propeller systems.

In a further embodiment of any of the foregoing aircraft propulsion systems, the turbine engine includes first and second turbine engines and the main generator includes first and second generators driven by a corresponding one of the first and second turbine engines. Each of the first and second generators drives a corresponding one of the first and second electric motors.

In a further embodiment of any of the foregoing aircraft propulsion systems, includes a nacelle assembly spaced apart from the aircraft fuselage. The secondary drive is disposed within nacelle assembly.

An aircraft propulsion assembly according to an exemplary embodiment of this disclosure, among other possible things includes a first contra-rotating open rotor propeller system supported on a first side of an aircraft fuselage. A second contra-rotating open rotor propeller system is supported on a second side of the aircraft fuselage. A turbine engine is supported within the aircraft fuselage. A main power transfer system is mechanically coupled to the turbine engine and supported within the aircraft fuselage. A first drive is driven by the main power transfer system for driving the first contra-rotating open rotor propeller system. A second drive is driven by the main power transfer system for driving the second contra-rotating open rotor propeller system.

In a further embodiment of any of the foregoing aircraft propulsion assemblies, the main power transfer system includes a main gearbox driven by the turbine engine through a main shaft.

In a further embodiment of any of the foregoing aircraft propulsion assemblies, the first drive and the second drive include gearboxes mechanically coupled to the main gearbox and configured to generate for counter rotation of the corresponding first contra-rotating open rotor propeller assembly and the second contra-rotating open rotor propeller assembly.

In a further embodiment of any of the foregoing aircraft propulsion assemblies, the main power transfer system includes a main generator and the first drive and the second drive include first and second electric motors electrically coupled to the main generator.

In a further embodiment of any of the foregoing aircraft propulsion assemblies, the turbine engine includes a first turbine engine and a second turbine engine and the main generator includes a first generator driven by the first turbine engine and a second generator driven by the second turbine engine.

In a further embodiment of any of the foregoing aircraft propulsion assemblies, the turbine engine includes a reverse flow turbine engine with a compressor communicating compressed air forward to a combustor to generate high energy exhaust gases forward to a turbine that is configured to drive the compressor.

In a further embodiment of any of the foregoing aircraft propulsion assemblies, includes a recuperator in communication with incoming airflow and outgoing exhaust gas flow.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
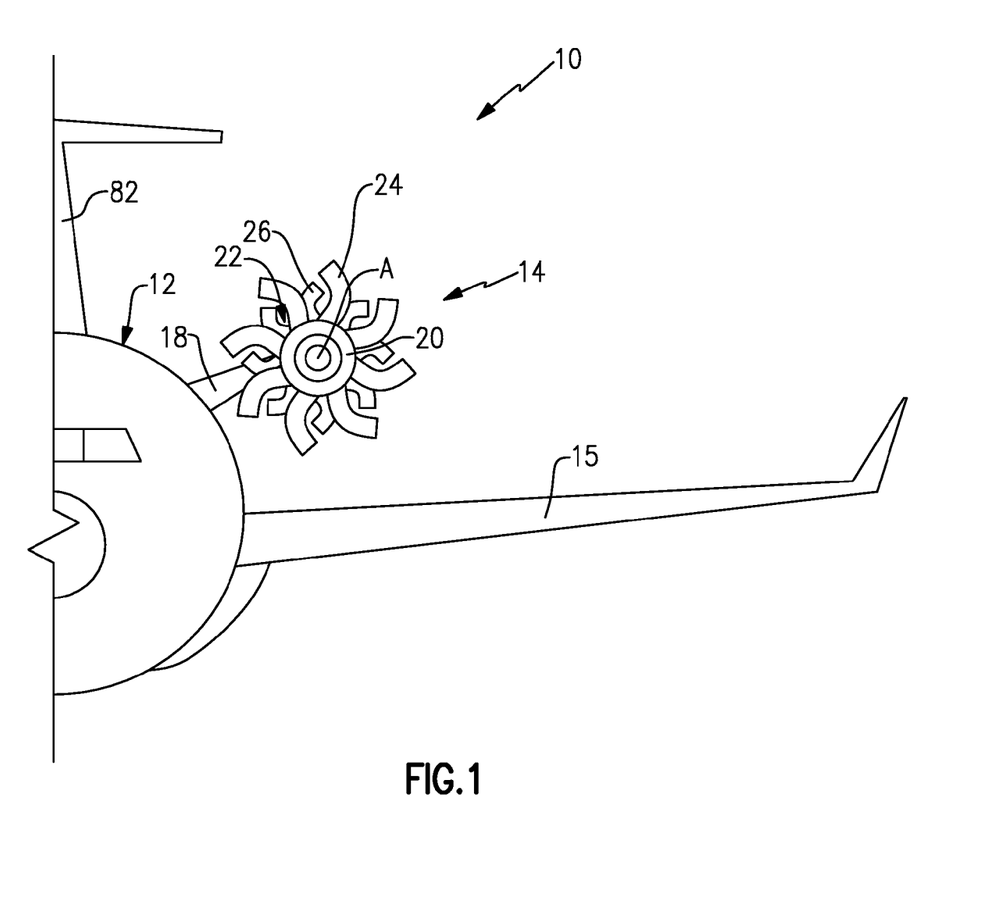
FIG. 1 is a schematic front view of an example contra-rotating open rotor (CROR) propulsion system.
Figures 2, 3:
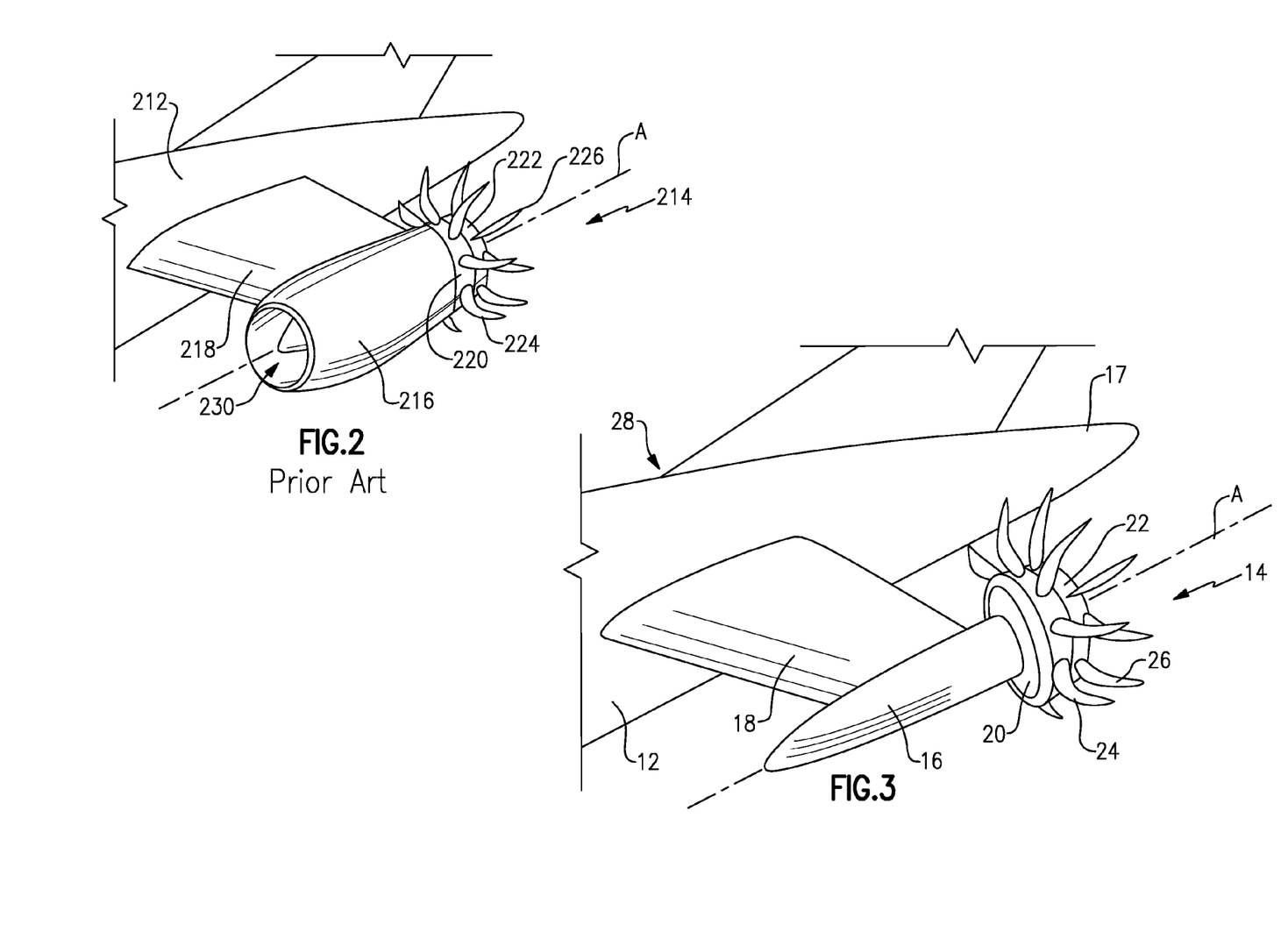
FIG. 2 is a schematic view of a prior art CROR propulsion system.
FIG. 3 is a schematic view of a disclosed example CROR propulsion system.

Referring to FIGS. 1 and 2, an aircraft 10 is schematically shown and includes contra-rotating open rotors (CROR) 14 mounted to pylon 18 on each side of the aircraft fuselage 12. A wing 15 extends outward from each side of the fuselage 12 and a vertical T-tail stabilizer (and rudder(s)) 82 extends upward. In the T-tail horizontal stabilizer configuration, the horizontal stabilizer (and elevators) is mounted on top of the vertical stabilizer away from the engine's exhaust and propellers' turbulent wake. T-tail configurations are common for rear fuselage (i.e., empennage)-mounted engines as shown in FIGS. 1 and 2. The CROR 14 includes two rotors, a forward rotor 20 and an aft rotor 22. The first rotor 20 includes a first plurality of propeller blades 24 and the second rotor includes a second plurality of propeller blades 26. Each of the rotors 20, 22 rotate about a common longitudinal axis A. One of the rotors 20, 22 is configured to rotate clockwise and the other is configured to rotate counterclockwise.

In this example, the forward rotor 20 rotates in a clockwise direction and the aft rotor 22 rotates in a counterclockwise direction. The disclosed example propeller blades 24, 26 are highly swept "Scimitar"-style "pusher" propeller blades. It should be understood, that other propeller shapes and configurations are within the contemplation of this disclosure. Moreover, although a pusher propeller system is disclosed, a "pull" propeller system is also within the contemplation of this disclosure.

In this disclosure, the term contra-rotation is utilized to describe a propulsion system where different rotors rotate about a common axis in different directions. The term counter-rotating is utilized in this disclosure to describe a propulsion system where propeller rotors on opposite sides of the aircraft fuselage 12 rotate in opposite directions.

The example aircraft propulsion system includes a pusher CROR 14 mounted within a nacelle 16 supported by a pylon 18 on either side of the aircraft fuselage 12. The CROR 14 may be counter-rotated with respect to the CROR 14 on the opposite side of the aircraft 10, but may also be rotated in common directions regardless of the side of the aircraft 10 on which it is mounted. Both configurations are within the contemplation of this disclosure. The nacelle 16 is spaced apart from the fuselage 12 by the pylon 18.

Referring to FIG. 2, a prior art contra-rotating open rotor system 214 is shown and includes a turbine engine 230 supported within a nacelle 216 spaced apart from the aircraft fuselage 212 by a pylon 218. The turbine engine 230 drives a forward rotor 220 including a forward plurality of propeller blades 224 and an aft rotor 222 including an aft plurality of propeller blades 226.

The turbine engine 230 is of a significant weight and provides a large radial cross-section. The pylon 218 is required to be of sufficient structural strength to support the weight and structure of the turbine engine 230. The required pylon structure can constrain the amount of spacing form the aircraft fuselage 212 and thereby limit the diameter of the propeller blades 224, 226. Additionally, the radial cross-section of the turbine engine 230 can reduce the efficiency of the propeller blades 224, 226.

Figure 4:
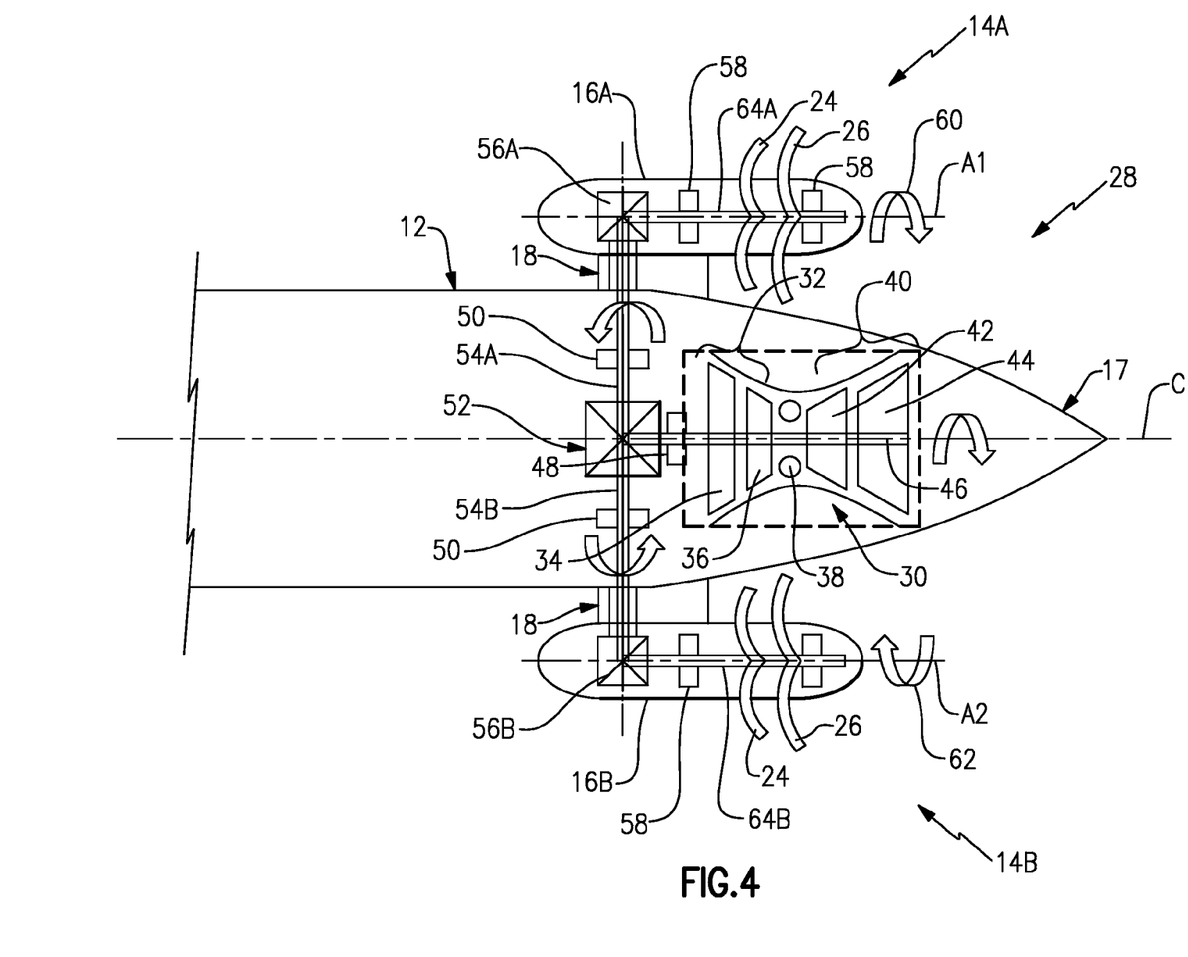
FIG. 4 is a schematic view of an example disclosed distributed propulsion system including a gas turbine engine mechanically coupled to drive first and second CROR assemblies.

Referring to FIGS. 3 and 4, a disclosed distributed propulsion system 28 includes the CROR 14 that is driven by a turbine engine 30 (as shown in FIG. 4) supported within the aircraft fuselage 12. The distributed propulsion system 28 includes a highly-efficient turbine engine 30 located along the aircraft longitudinal axis C inside the aircraft fuselage 12 near its tail cone 17. The highly-efficient gas turbine engine can be of any of the architectures such as but not limited to: turboshaft, turbojet, low-bypass turbofan, high-bypass turbofan, geared turbofan (GTF), etc. The turbine engine 30 drives a first CROR system 14A and a second CROR system 14B mounted within corresponding nacelles 16A, 16B on either side of the aircraft fuselage 12. In this example, the first CROR system 14A rotates in a first direction 60 and the second CROR system 14B rotates in a second direction 62 opposite the first direction 60 about CROR axes A1 and A2, respectively. As appreciated, each of the first and second CROR systems 14A, 14B are contra-rotating, however, rotation of the forward and aft rotors 20, 22 can be counter-rotating relative to the CROR system mounted to on the opposite side of the aircraft fuselage 12. Moreover, while the disclosed examples are CROR systems, it is within the contemplation of this disclosure to utilize a single propeller rotor rotating about a common axis.

The example turbine engine 30 includes a compressor section 32 that feeds compressed air to combustor 38 where fuel is mixed with the air and ignited to generate a high energy gas flow. The high energy gas flow expands through at turbine section 40. The turbine section 40 includes a high pressure turbine 42 and a low pressure turbine 44. The high pressure turbine 42 is coupled to a high pressure compressor 36. The low pressure turbine 44 is coupled to a low pressure compressor 34 through shaft 46. Although a single shaft 46 is schematically shown, the high pressure compressor 36 is coupled to the high pressure turbine 42 through a second outer shaft (not shown) as is known. Although not shown in FIG. 4, a three-shaft (spool) gas turbine engine is also within the contemplated possibilities of this disclosure. A typical three-shaft turbine engine adds an intermediate shaft nestled concentrically between the high-pressure shaft and the low-pressure shaft. The intermediate shaft connects the intermediate-pressure turbine with the intermediate-pressure compressor.

The shaft 46 is supported by bearing assembly 48 and output is transmitted to a main drive 52 that in turn drives secondary drives 56A and 56B. In this example the main drive is a main differential gearbox 52 and the secondary drives are CROR engine gearboxes 56A, 56B. Intermediate shafts 54A and 54B supported by bearing assemblies 50 extend from the main differential gearbox 52 and the drive smaller CROR engine gearboxes 56A, 56B for each of the first and second CROR systems 14A, 14B. Each of the CROR gearboxes 56A, 56B drive a corresponding contra-rotating shaft system 64A, 64B supported by bearing assemblies 58 within the nacelle 16A, 16B. The forward and aft rotors 20, 22 of the corresponding CROR system 14A, 14B are driven through the corresponding gearbox 56A, 56B by the concentric contra-rotating drive shaft system 64A, 64B.

Because the turbine engine 30 is mounted within the aircraft fuselage 12 and not within each nacelle 16A, 16B, each of the nacelles 16A, 16B supporting the corresponding CROR systems 14A, 14B can be very small with a minimal front cross section. In fact, the nacelles 16A, 16B need only be large enough to support the corresponding gearbox 56A, 56B and the drive shaft system 64A, 64B.

The example propulsion system 28 enables mounting of the CROR systems 14A, 14B further aft on the aircraft fuselage in a position aft of aircraft wakes that reduces noise and increases propulsive efficiency. Moreover, because the turbine engine 30 powering the CROR systems 14A, 14B is mounted within the aircraft fuselage 12 instead of within the nacelle 16A, 16B, a smaller nacelle 16A, 16B and therefore a smaller pylon support structure 18 can be utilized. The nacelles 16A, 16B and pylon 18 need be only large enough to contain the CROR drive system including the CROR gearbox 56A, 56B, shaft system 64A, 64B, bearing assemblies 58 and rotors 20, 22. Furthermore, the nacelles 16A, 16B may be spaced further away from the fuselage 12 to enable the use of larger diameter propellers 24, 26 and thereby an increased production of propulsive thrust for the same engine power input.

Figure 5:
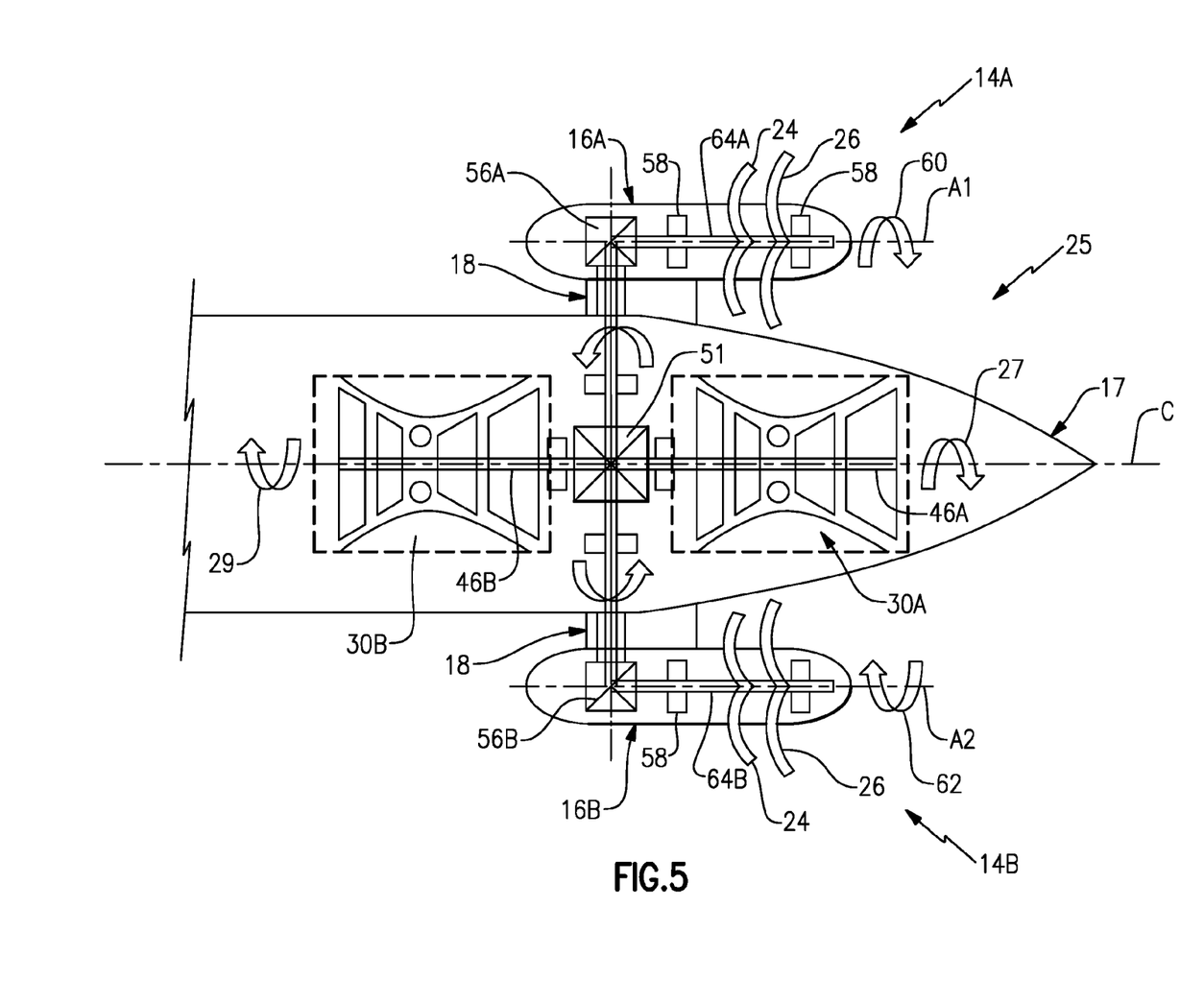
FIG. 5 is schematic view of another example disclosed distributed propulsion system including first and second gas turbine engines mechanically coupled to drive a common main gearbox.

Referring to FIG. 5 another example propulsion system 25 includes two turbine engines 30A, 30B that are disposed along the aircraft longitudinal axis C and turning in directions 27 and 29, respectively. Each of the turbine engines 30A, 30B drives a corresponding shaft 46A, 46B coupled to drive a main drive 51. In this example, the main drive 51 is a differential gearbox 51 receiving driving input from each of the first and second turbine engines 30A, 30B. The two gas turbine engines 30A, 30B provide a desired redundancy within the propulsion system 28. The gas turbine engines 30A, 30B are placed in series for driving each of the CROR systems 14A, 14B through the same main differential gearbox 51.

Figure 6:
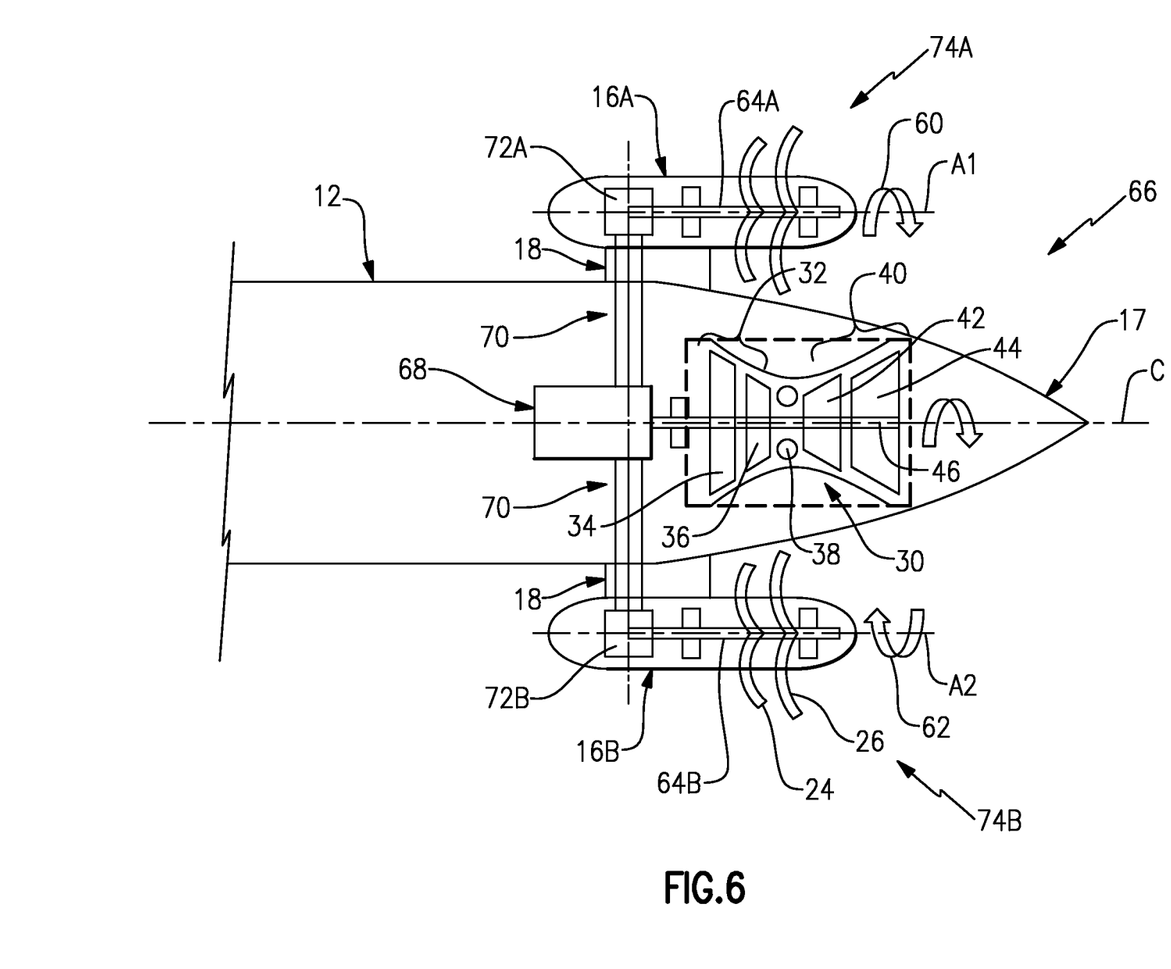
FIG. 6 is a schematic view of another example disclosed distributed propulsion system including a gas turbine engine driving an electric generator electrically coupled to drive first and second CROR system.

Referring to FIG. 6, another example propulsion system 66 is shown where the main drive is a generator 68 driven by a gas turbine engine 30 that produces electric power and communicates that electric power to secondary drives that are electric motors 72A, 72B mounted within corresponding nacelles 16A, 16B to power the corresponding CROR system 74A, 74B. Electric power is communicated through cables 70 to each corresponding electric motor 72A, 72B. The use of electric cables 70 to transmit power reduces complexity and overall system weight. The electric motors 72A, 72B can either drive a corresponding gearbox that provides the desired contra-rotation of the rotors 20, 22, or may be configured to drive different shafts corresponding to the different rotors 20, 22. The two different motors can drive either of the gearboxes to provide operational redundancy. Moreover, each of the different motors drives a separate shaft to provide improved electrical speed control of the shafts. Additionally, the contra-rotating "twin" shaft can be geared off of the first shaft.

Figure 7:
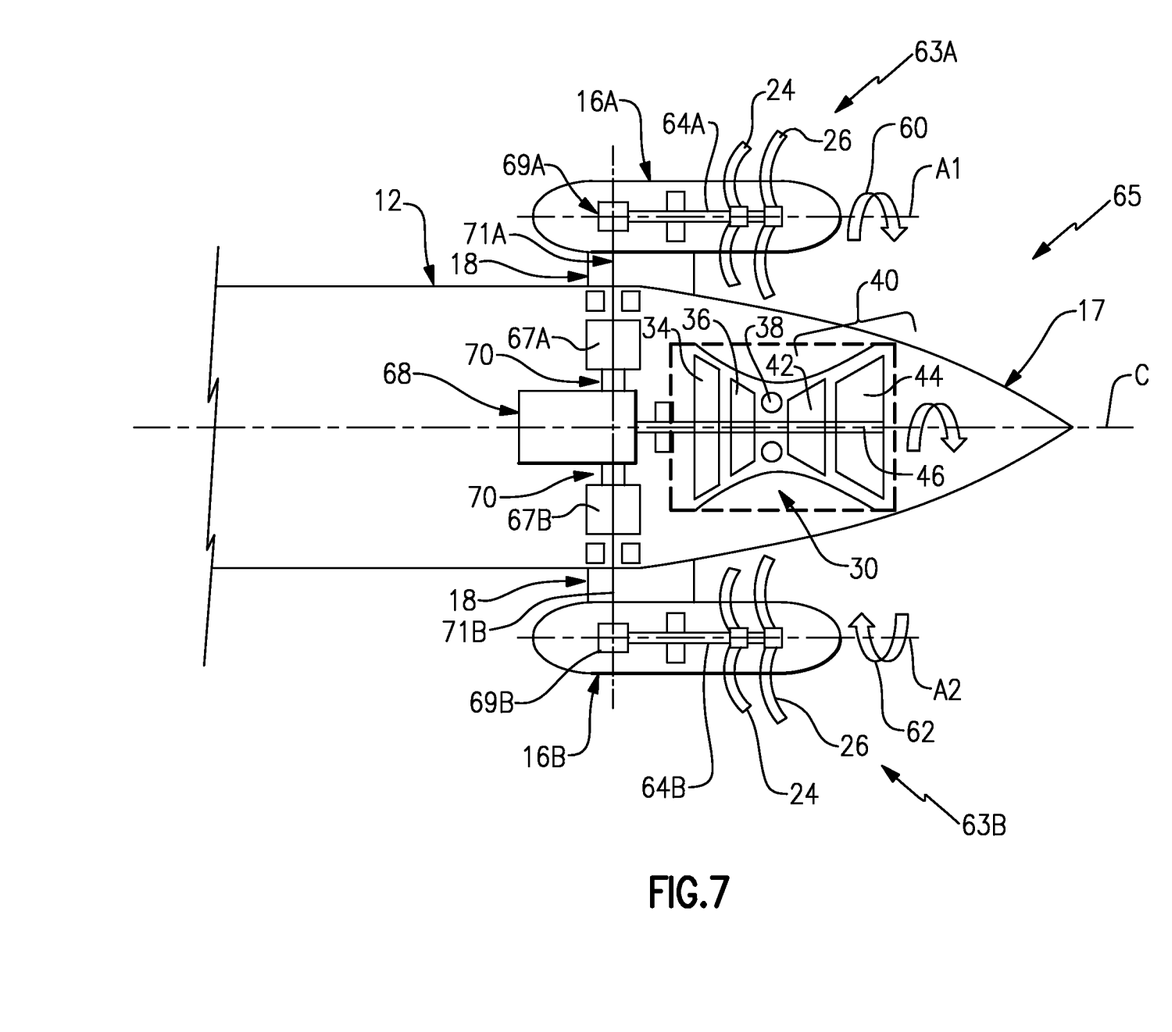
FIG. 7 is a schematic view of another example disclosed distributed propulsion system.

Referring to FIG. 7 another example propulsion system 65 is shown where the main drive is a generator 68 driven by a gas turbine engine 30 that produces electric power and communicates that electric power to electric motors 67A, 67B mounted within aircraft fuselage 12. The electric motors 67A, 67B in turn drive corresponding CROR gearboxes 69A, 69B that are mounted within corresponding nacelles 16A, 16B through shafts 71A, and 71B. The gearboxes 69A, 69B drive the corresponding CROR system 63A, 63B. Electric power is communicated through cables 70 to each corresponding electric motor 67A, 67B. The electric motors 67A, 67B drive the corresponding gearbox 69A, 69B that provides the desired contra-rotation of the rotors 20, 22. Mounting of the electric motors 67A, 67B within the aircraft fuselage 12 provides for a very small cross-section of the nacelles 16A, 16B.

Figure 8:
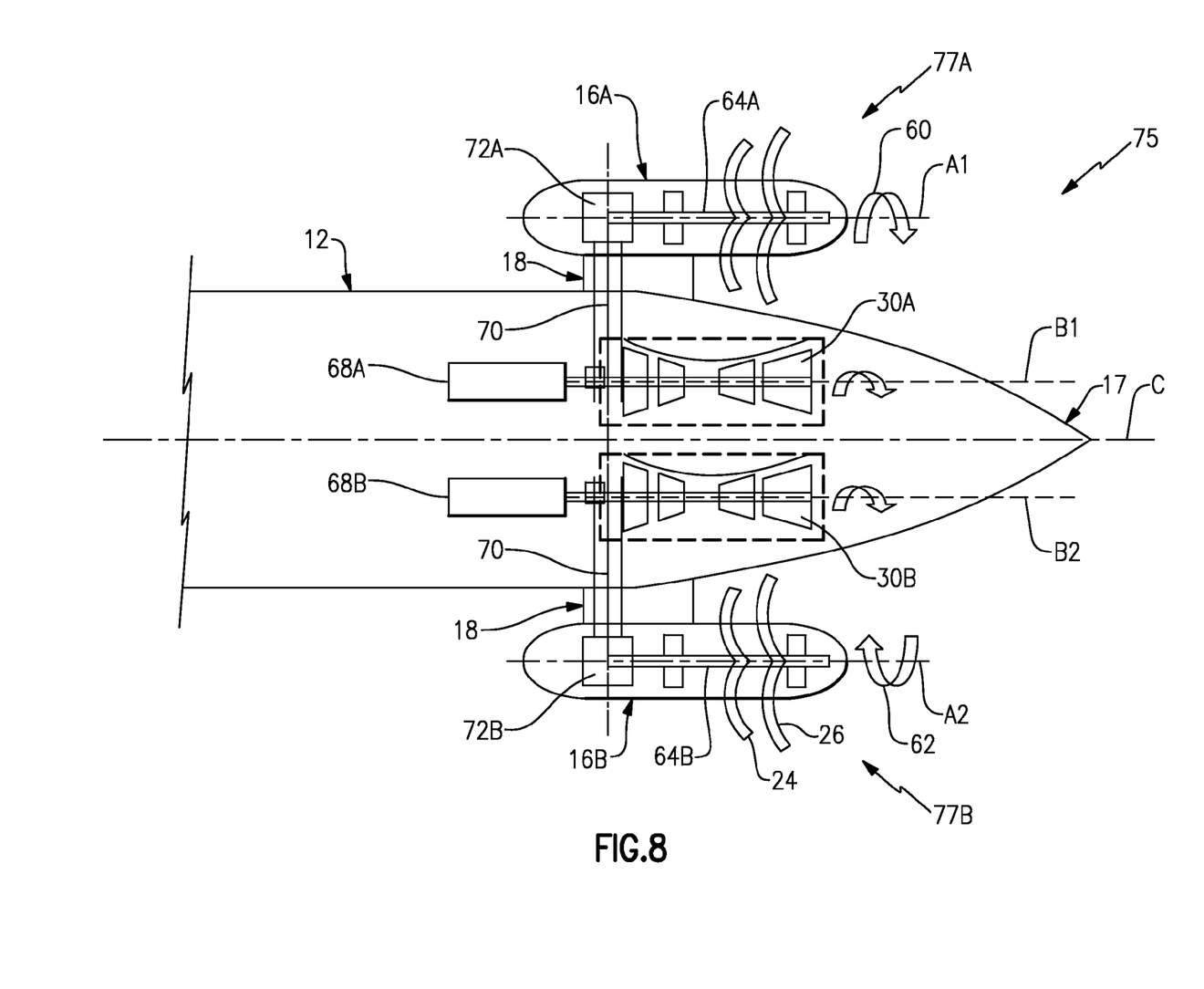
FIG. 8 is a schematic view of an example disclosed distributed propulsion system including first and second turbine engines driving corresponding electric generators electrically coupled to drive first and second CROR systems.

Referring to FIG. 8, another example propulsion system 75 includes two smaller compact turbine engines 30A, 30B positioned axially side-by-side in the rear fuselage 12 and rotating about longitudinal axes B1 and B2, respectively. Both axes B1 and B2 are equidistant from the main central axis C. The axis B1 is on the starboard side, while the axis B2 is in the port side of the aircraft fuselage 12. Each of the turbine engines 30A, 30B drives a separate main drive that in turn drives a secondary drive. In this example the main drives are separate electric generator 68A, 68B that in turn drives the electric motor 72A, 72B for the corresponding CROR system 77A, 77B. Each of the electric motors 72A, 72B drives the corresponding concentric contra-rotating shaft systems 64A, 64B for driving the rotors 20, 22 in opposing directions. Each of the electric motors 72A, 72B can be placed either in the CROR's nacelles 16A, 16B (as shown in FIG. 8), or inside the aircraft fuselage 12 in an architecture similar to the one shown in FIG. 7). Mounting the electric motors 72A, 72B within the aircraft fuselage 12 provides for a very small cross-section of the nacelles 16A, 16B.

The example propulsion system 75 provides improved system redundancy and finer speed control by the electric motors 72A, 72B. This capability can improve the overall operational efficiency and capability of the aircraft.

Figure 9:
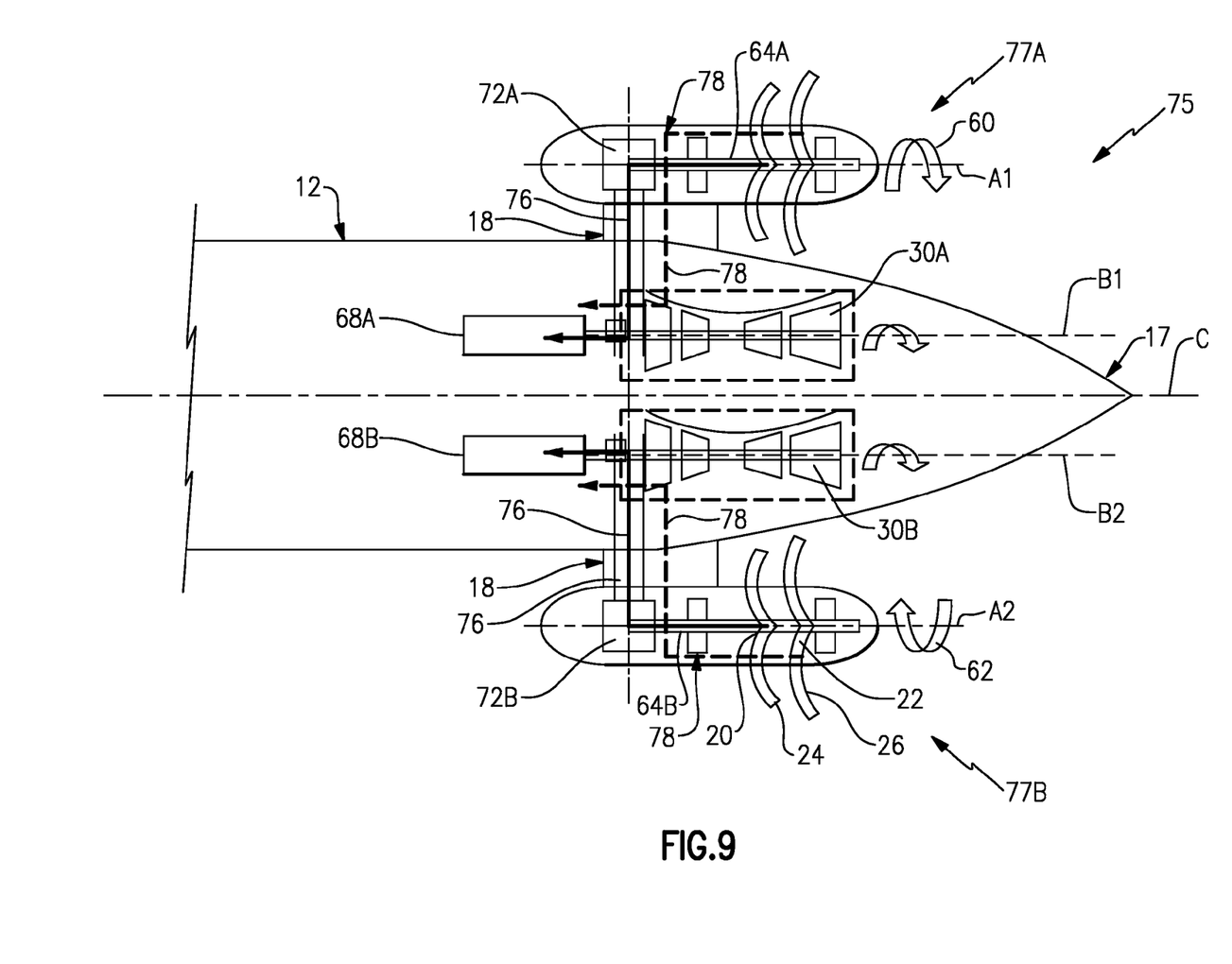
FIG. 9 is a schematic view of windmill operation of the example distributed propulsion system of FIG. 8.

Referring to FIG. 9, the example propulsion systems enable windmilling of the CROR propellers 24, 26 if the turbine engines 30A/30B fail in flight. Windmilling of the propellers 24, 26 can turn the electric motors 72A, 72B into generators to perform the function of a Ram Air Turbine (commonly referred to as a "RAT") to generate electric power. The multi-bladed CROR systems 77A, 77B improve efficiency of extracting power from the air slip-stream while the redundancy improves safety. Because each of the CROR systems 77A, 77B includes two independently rotatable rotors 20, 22, each rotor will turn the corresponding electric motor 72A, 72B and thereby improve operation and efficiency of power generation.

During windmilling operation, the propellers 24, 26 will drive the shaft systems 64A, 64B to drive the corresponding electric motor 72A, 72B. The two contra-rotating rotors provide an increased efficiency in power generation as compared to a single-axle, two-bladed "conventional" RAT. The example CROR system 77A, 77B enable decoupling of the concentric shaft systems 64A, 64B so that one or two, or three or all four propellers 24, 26 can independently extract kinematic energy from the slipstream by turning their respective shafts thus in turn powering the on-board electric generators 68A, 68B, respectively. The independent power generation is schematically indicated by solid line 76 and dashed line 78. The solid line 76 represents power generation from the forward rotor 20 and propeller 24, and the dashed line 78 represents power generation from the aft rotor 22 and propeller 26.

Figure 10:
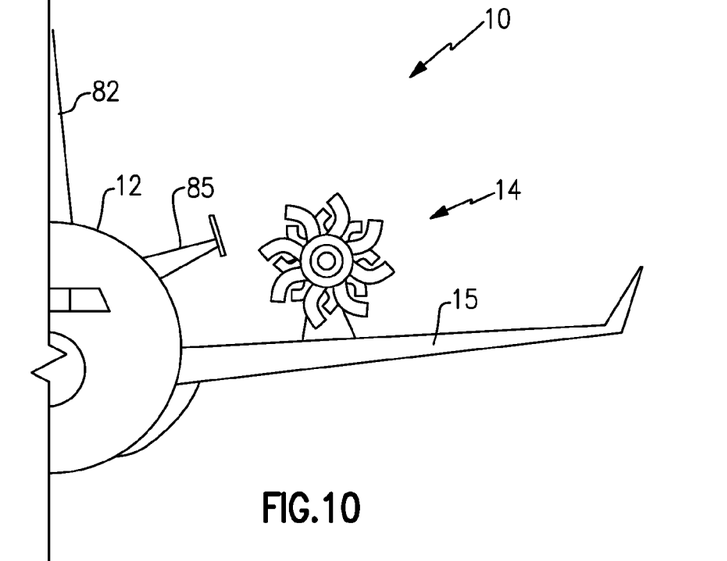
FIG. 10 is a schematic view of another mounting location for a disclosed CROR system.
Figure 11:
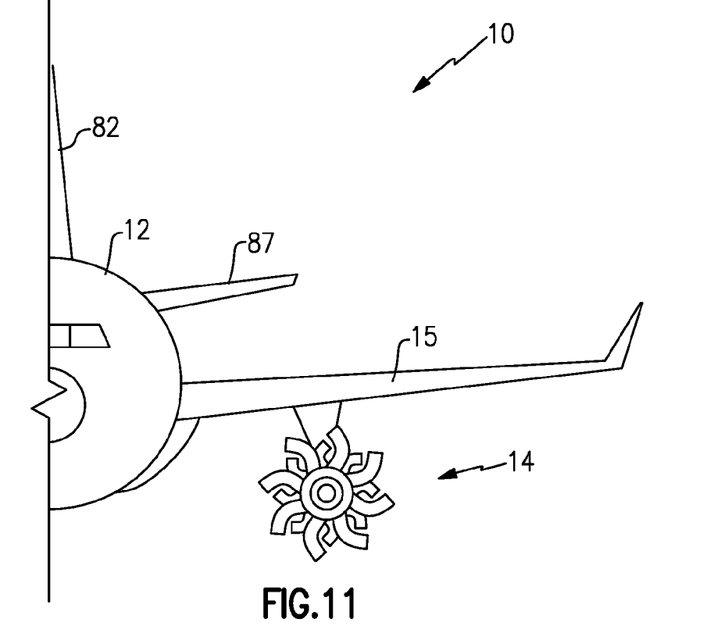
FIG. 11 is a schematic view of another mounting location for a disclosed CROR system.

Referring to FIGS. 10 and 11, an aircraft 10 including the distributive propulsion systems 66 and 75 shown in FIGS. 6 and 8 respectively, provide for alternate positioning of the CROR system 14. Because power is transmitted through cables 70 additional optional mounting locations of the example CROR systems become possible. Because the motors 72 are not mechanically coupled to the turbine engine 30, or a main gearbox, the CROR systems can be located further away from the fuselage 12. In one example shown in FIG. 10, the CROR system is mounted on a top surface of the aircraft wing 15. In another example shown in FIG. 11, the CROR system is mounted below the aircraft wing 15. Additionally, the CROR system enables lighter more efficient support structures because support is only required for the structures required to rotate the CROR system and not for the entire turbine engine.

FIG. 10 includes a horizontal stabilizer (with elevators) 85 that is modified to accommodate the mounting position of the CROR system 14. In this example, the horizontal stabilizer (with elevators) 85 is shortened and slightly angled upward such that is remains out of the airflow generated by the CROR system 14 toward the aft portion of the aircraft 10. The vertical stabilizer (with rudder(s)) 82 and the horizontal stabilizer (with elevators) 85 can be either of the conventional tail configuration or of the cruciform tail with no loss of functionality to the disclosed invention. In the conventional tail configuration, the horizontal stabilizer is mounted directly to the empennage (i.e., the rear fuselage). In the cruciform tail configuration, the horizontal stabilizer intersects the vertical stabilizer somewhere in the middle of the vertical stabilizer in a "cross"-like formation.

FIG. 11 includes a horizontal stabilizer 87 (with elevators) that is mounted directly to the aircraft fuselage 12 rear portion (empennage) in a conventional tail configuration including a vertical stabilizer (with rudder(s)) 82. The indicated location of the horizontal stabilizer (with elevators) 87 is such that it is spaced away from airflow and prop wash generated by the CROR system 14 mounted below the wing of the aircraft 10.

Figure 12:
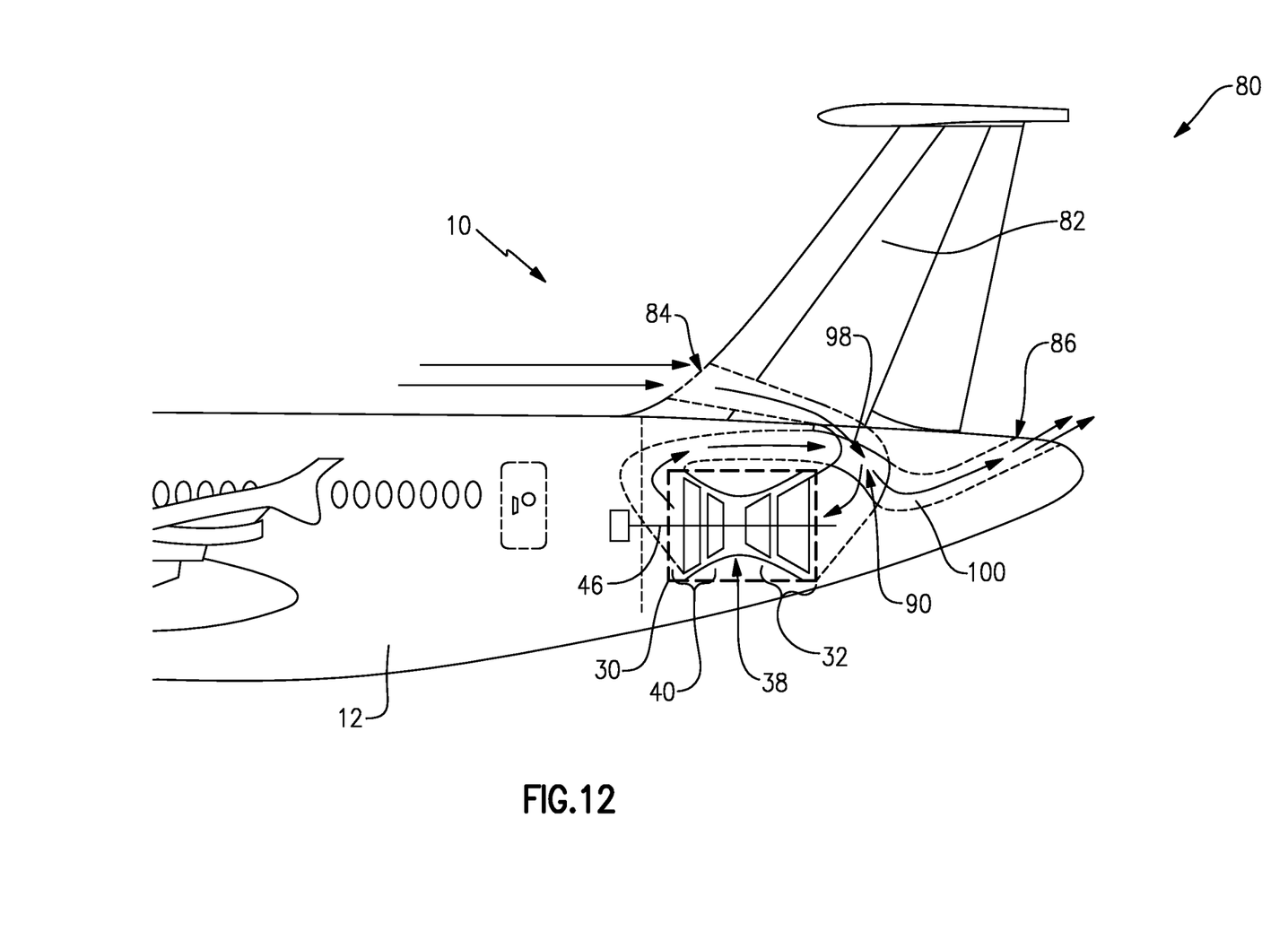
FIG. 12 is a schematic view of an example reverse flow mounting configuration of a gas turbine engine.

Referring to FIG. 12, decoupling the gas generator from the CROR system enables additional optional engine mounting arrangements that can improve efficiency. An example engine mounting system 80 can be utilized with any of the example propulsion systems to thermodynamically improve operation. In the example engine mounting system 80 the turbine engine 30 is be mounted and operated in a "reverse flow" engine configuration. In the illustrated reverse flow engine configuration, the compressor section 32 is mounted aft of the turbine section 40. Accordingly, the compressor section 32 faces aft, the turbine section 40 faces forward and the power shaft 46 extends forward from the turbine section 40. Airflow is communicated through an intake 84 near the base/root of the aircraft vertical stabilizer (with rudder(s)) 82 to the aft facing compressor section 32, which moves forward, consecutively, through the combustor and turbine, and exhaust gases from the turbine section 40 are turned aft, and directed back through an outlet 86 past the incoming airflow.

An air intake passage 98 directs incoming air from the inlet 84 to the compressor section 32 and an exhaust gas duct 100 directs exhaust gases to the upward-directed/oriented outlet 86. Each of the intake passage 98 and exhaust passage are "S"-shaped to enable crossing flow through a recuperator 90. The recuperator 90 utilizes the thermal difference between the hot engine exhaust gas and the cold inlet air flow. The recuperator 90 utilizes the engine exhaust flow to preheat airflow to the combustor 38. Accordingly, inlet airflow to the combustor 38 is preheated by the hot exhaust. The preheated inlet air to the combustor 38 improves the engine's overall thermodynamic efficiency by decreasing the required work done on the inlet air by the compressor section 32. In addition, the preheated air entering the combustor 38 facilitates the liquid fuel break-up and droplet atomization for improved combustor light-off, stability, and operational economy. The recuperator also lowers the temperature of the exhaust gas exiting through the outlet 86, thus making the cooler exhaust less detectable by enemy heat-seeking infra-red (IR) missiles. Although a T-tail configuration is shown with vertical stabilizer 82 in FIG. 12, other tail architectures (i.e., such as the ones shown in FIGS. 10 and 11, etc.) are also contemplated. In fact, since the main engine is inside the fuselage, the choice of tail configurations will depend on the actual placement of the CROR propulsion systems around the aircraft's fuselage 12.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:
    a first turbine engine and a second turbine engine supported within an aircraft fuselage;
    a main drive driven by each of the first and second turbine engines;
    a first open propeller system and a second open propeller system supported outside of the aircraft fuselage separately from the first and second turbine engines, wherein each of the first open propeller system and the second open propeller system comprise contra-rotating open rotor propeller system; and first and second secondary drives driven by the main drive and coupled for driving a respective one of first open propeller system and the second open propeller system.

2. The aircraft propulsion system as recited in claim 1, wherein the contra-rotating open rotor propeller system includes a forward propeller assembly and an aft propeller assembly having an outer diameter larger than the forward propeller assembly.

3. The aircraft propulsion system as recited in claim 2, wherein the secondary drive comprises a gearbox for generating contra rotation of the forward propeller assembly and the aft propeller assembly about a common axis of rotation.

4. The aircraft propulsion system as recited in claim 1, wherein the main drive comprises a main gearbox and the first and second secondary drives comprise a propeller gearbox and the main gearbox is mechanically coupled to drive the propeller gearbox.

5. The aircraft propulsion system as recited in claim 4, wherein the main gearbox is supported within the aircraft fuselage and is driven through a mechanical coupling to the first and second turbine engines.

6. The aircraft propulsion system as recited in claim 1, including a nacelle assembly spaced apart from the aircraft fuselage, wherein the secondary drive is disposed within nacelle assembly.

7. An aircraft propulsion assembly comprising:
a first contra-rotating open rotor propeller system supported on a first side of an aircraft fuselage;
a second contra-rotating open rotor propeller system supported on a second side of the aircraft fuselage;
a first turbine engine and a second turbine engine supported within the aircraft fuselage and aligned along a main longitudinal axis of the aircraft fuselage;
a main power transfer system mechanically coupled to both the first turbine engine and the second turbine engine and supported within the aircraft fuselage;
a first drive driven by the main power transfer system coupled for driving the first contra-rotating open rotor propeller system; and
a second drive driven by the main power transfer system coupled for driving the second contra-rotating open rotor propeller system.

8. The aircraft propulsion assembly as recited in claim 7, wherein the main power transfer system comprises a main gearbox driven by the turbine engine through a main shaft.

9. The aircraft propulsion assembly as recited in claim 7, wherein the first drive and the second drive comprise gearboxes mechanically coupled to the main gearbox and configured to generate for counter rotation of the corresponding first contra-rotating open rotor propeller assembly and the second contra-rotating open rotor propeller assembly.

10. The aircraft propulsion system as recited in claim 7, wherein at least one of the first turbine engine and the second turbine engine comprises a reverse flow turbine engine with a compressor communicating compressed air forward to a combustor to generate high energy exhaust gases forward to a turbine that is configured to drive the compressor.

11. The aircraft propulsion system as recited in claim 10, including a recuperator in communication with incoming airflow and outgoing exhaust gas flow.

\* \* \* \* \*

UNITED STATES PATENT AND TRADEMARK OFFICE
CERTIFICATE OF CORRECTION

PATENT NO. : 9,701,395 B2
APPLICATION NO. : 14/578975
DATED : July 11, 2017
INVENTOR(S) : Leo J. Veilleux, Jr. and Lubomir A. Ribarov Page 1 of 1

It is certified that error appears in the above-identified patent and that said Letters Patent is hereby corrected as shown below:

In the Claims

In Claim 8, Column 10, Line 15; after "gearbox driven by" replace "the turbine engine" with --both the first turbine engine and the second turbine engine--

In Claim 9, Column 10, Line 16; after "propulsion assembly as recited" replace "in claim 7," with --in claim 8,--

Signed and Sealed this
Twenty-fourth Day of July, 2018

Andrei Iancu
*Director of the United States Patent and Trademark Office*